INVENTOR
GEORG E. KNAUSENBERGER
BY
Mitchell & Bechert
ATTORNEYS

INVENTOR
GEORG E. KNAUSENBERGER
BY Mitchell & Bechert
ATTORNEYS

INVENTOR
GEORG E. KNAUSENBERGER
BY Mitchell & Bechert
ATTORNEYS

United States Patent Office 3,040,313

Patented June 19, 1962

3,040,313

MEANS FOR MAXIMIZING PULSE-DATA TRANSMISSION OVER NARROW-BAND LINKS

Georg E. Knausenberger, State College, Pa., assignor, by mesne assignments, to HRB-Singer, Inc., State College, Pa., a corporation of Delaware Filed Feb. 24, 1958, Ser. No. 717,029

14 Claims. (Cl. 343—11)

This invention relates to information transmission over communication links and more particularly apparatus for minimizing the distortion introduced in signals being transferred over communication links of limited bandwidth.

In the transmission of signals over conventional communication links, such as telephone lines, the phase distortion and amplitude distortion introduced in the transmitted signals by the communication link are dependent on the spread of the frequency spectra (of the transmitted signals) over the width of the communication band, and various measures have been adopted to minimize these distortions. In the radar-relay system disclosed in copending application of John McLucas, Serial No. 482,998, filed January 20, 1955, now Patent No. 2,883,658, and assigned to the assignee of this application certain techniques are shown for compressing the frequency band of information signals transmitted from a remote radar receiver via a narrow-band communication link to a central station. Although the frequency-compression techniques employed in the said application have proven satisfactory, there is a constant demand for accommodation of greater intelligence within a given band or channel, thus calling for more improved techniques which may be employed jointly with the previously disclosed techniques in a similar system or used alone in related systems.

In such systems, the information is transmitted in the form of a pulse-modulated carrier. To minimize cut-off or amplitude distortion, the carrier frequency is usually located at the center point of the pass band of the communication link. However, the effect of the S-shaped phase characteristic of such a link requires the location of the carrier frequency at its inflection point for minimum phase distortion. Unfortunately, in most instances these two points do not occur at the same frequency. It has also been found that a phase distortion may exist close to the peak of the frequency spectrum amplitudes.

In addition, the conventional pulse modulation of the carrier signal causes a broad-band spectrum spread which interferes with neighboring channels when the degree of modulation is maximized and pulse duration minimized. Although a degree of modulation less than one results in a reduction of spectrum spread, more energy must be expended in transmitting the waveforms.

It has further been found that, when transmitting two channels of information signals over the same communication link, there is interference between the channels. For example, in the above-cited system in which the transmission system consists of a video-information channel and an azimuth-information channel such that the video channel is a relatively wide band containing the major portion of the video pulse spectrum while the azimuth channel is of narrower width, there has been found to be interference between the two channels.

It is, therefore, a general object of the invention to provide improved methods of information transmission.

It is another general object of the invention to provide improved data transmission apparatus for minimizing the distortion of information signals introduced by a limited bandwidth communication link.

It is a specific object of the invention to provide improved apparatus for transmitting information signals by a modulated-carrier signal which minimizes both the phase and amplitude distortion introduced by a limited-bandwidth communication link.

It is another specific object of the invention to provide apparatus in a data-transfer system which transmits information signals having a minimum frequency-spectrum width to a narrow-band communication link.

It is a further object of the invention to provide in a dual-channel information system apparatus for generating information signals which minimally interfere with each other.

Other objects and various further features of novelty and invention will be pointed out or will occur to those skilled in the art from a reading of the following specification in conjunction with the accompanying drawings. In said drawings, which show, for illustrative purposes only, preferred forms of the invention:

Briefly, in accordance with one aspect of the invention, I provide apparatus for and a method of transmitting information signals over a communication link having a limited bandwidth of $f$ cycles per second. The information signals are transmitted as a modulated-carrier signal. The frequency of the carrier signal is adjustable between an upper limit and a lower limit both of which are within the bandwidth of the communication link. The resulting carrier frequency permits the transmission of an information-modulated carrier that has an optimum fidelity in amplitude and phase.

In a second aspect of the invention, the information signals, as pulses, activate a sinusoidal carrier-signal generator. The sinusoidal signal transmitted by the generator is always an integral number of sinusoid cycles. The sinusoidal signal generator is designed to transmit sinusoidal signals that always start and terminate at zero amplitude.

In a further aspect of the invention, I provide apparatus for transmitting two classes of information over a limited-bandwidth communication link. The first class of information is transmitted as a modulated-carrier signal having a given frequency, and the second class of information is transmitted as modulated-carrier signal having a frequency which is an integer multiple of the given frequency.

It should be noted that in the optimizing of the transmission of the information signals various combinations of the three aspects of the invention may be employed.

Although the invention will be described in relation to the above cited radar-relay system, it should be understood that any or all aspects of the invention either singly or in combination are admirably suited for other data-transfer systems.

Figure 1:
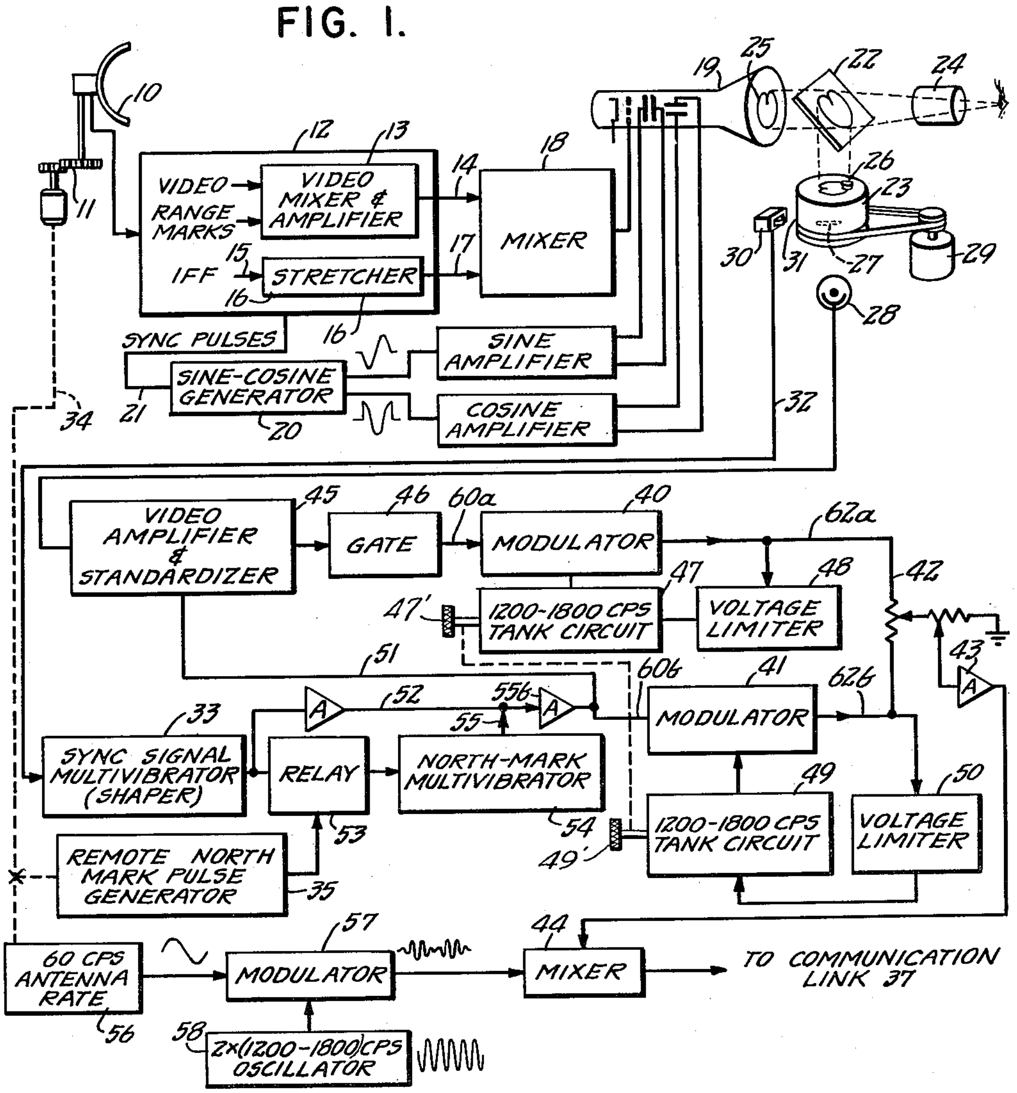
FIG. 1 shows in block diagram form the components of a radar-relay system which includes a variable-carrier-frequency generator in accordance with one aspect of the invention.

Referring to FIG. 1 of the drawings, apparatus in accordance with the invention is shown incorporated in a PPI (plan-position-indicating) radar having an antenna 10 and a drive means 11 for continuously rotating the same. The radar may include a receiver 12 containing, among other things, a video mixer and amplifier 13, accepting raw video and range mark pulses (synchronized with the pulse-repetition rate of the radar) and developing what will be called a radar-video signal in an output line 14. The radar 12 may also include IFF (identification of friend or foe) responsive means developing characteristic IFF pulses in a line 15. As will later more clearly appear, I process the IFF pulses in a stretcher 16 whereby an elongated pulse is derived in an output line 17 for each incoming IFF pulse or train of IFF pulses.

The radar-video line 14 and the IFF-pulse line 17 are shown applied to a mixer 18 so that a single video signal may be transmitted to a band compressor. The band compressor shown is of the variety in which an optical scan integrates a J-scope presentation of the radar signal at a rate representing a substantial submultiple of the pulse-repetition frequency of the radar. The J-scope display is created on a cathode-ray tube 19, intensity-modulated by the output of the mixer 18. The deflection circuits of the tube 19 are supplied by circular sweep means 20 (a sine-cosine generator) synchronized with the pulse-repetition frequency of the radar, as is suggested by the connection 21.

In the shown form, light from the cathode-ray tube 19 passes to a beam splitter or semi-reflecting mirror 22. Most of this light is reflected into a scanner 23 but enough may pass through the mirror to allow an operator to view through optics 24, as when making adjustments of the position and intensity of the circular J-scope trace 25. The scanner 23 is shown to contain a lens 26 so located as to focus a small arc of the circular trace 25 onto a slit 27. Light passing through the slit 27 is evaluated by a photo-multiplier 28. A motor 29 continuously rotates the scanner 23 so as to cause the photo-multiplier 28 to look at successive elements of the circular trace. Since the rotation rate of the scanner 23 is very much reduced from the pulse-repetition frequency of the radar, the output of the photo-multiplier 28 is a signal which is a slowed-down version of the original video-signal output of the mixer 10; this output of photo-multiplier 28 is therefore called a slowed-down video signal.

Synchronizing signals based on the period of the slowed-down video may be readily derived by a fixed magnetic pickup element 30 in conjunction with a magnetic element 31 affixed to the scanner 23 so that for each pass of magnetic element 31 past element 30 a synchronizing pulse may be developed in line 32. These synchronizing pulses are shown standardized by a circuit 33 which may be a one-shot or single-stability multivibrator serving uniformly to shape all synchronizing pulses as to level and duration.

The dashed line 34 suggests that pulses may be derived to identify the instant at which the antenna 10 passes through a given reference bearing. For the purposes of the present disclosure, such reference bearing will be simply referred to as "North" so that the generator 35 will be understood to provide a north-identifying pulse each time the antenna 10 passes through north.

As shown in FIG. 1, separate modulators 40 and 41 accommodate the slowed-down video signal and the synchronizing and north-identifying (North-Mark) pulses, respectively. The outputs of the modulators 40—41 are multiplexed by a summing network, including a voltage divider 42 with manually adjustable means for determining the relative level of multiplexing the respective outputs of the modulators 40 and 41. The preferred arrangement is such that the magnitude of modulated synchronizing and north-identifying pulses substantially exceeds the level of the modulated slowed-down video signals. At amplifier 43, there is suggested further means whereby the level of the multiplexed modulated signals may be adjusted for supplying a mixer 44 hereinafter described.

It has been found desirable to have a maximum of standardization and shaping of the input signals supplied to the respective modulators 40—41. Accordingly, the slowed-down video signals received from the photo-multiplier 28 are fed to a video-amplifier and standardizer 45 which may be a threshold device in conjunction with a clipping means whereby such slowed-down video signals as exceed threshold are passed with uniform amplitude to a gate 46. The gate 46 may be a single-stability multivibrator for further uniformly shaping pulses reflecting the video signals. The shaped pulses issuing from the gate 46 pass via the line 60 to the modulator 40 to ring and quench a tank circuit 47 tuned to the carrier frequency. A voltage limiter 48 is shown responsive to the modulator 40 and in controlling relation with the tank circuit 47. In like manner, a voltage limiter 49 and tank circuit 50 may function under control of the modulator 41.

The elements 40—47—48 and 41—49—50 will be seen to have the functions of keyed oscillators in that they transmit bursts of carrier signal, all in accordance with their respective input-signal or modulating-signal control from gate 46 or from multivibrators 33 and 54, as the case may be. It should be understood that these structures may be considered to be in a broad sense modulators as used throughout the present description.

To accomplish the multiplexing, apparatus is also included which permits either a transfer of the video-modulated carrier from the line 62*a* or the synchronizing (sync) signal-modulated carrier from the line 62*b* to the mixer 44. In the indicated preferred arrangement, the sync signal is effective to cut off the modulator 40 or to disable the supply of video signals thereto. In the form shown, this is effected by a line 51 connected from the sync amplifier 55*b* to a gain-control connection in amplifier 45. All synchronizing signals are fed directly from multi-vibrator 33 to the input of modulator 41 by way of line 52 and sync amplifier 55*b*. Thus, the summing circuit 42—43 will be supplied by modulator 40 to the exclusion of modulator 41 in the period between sync pulses, but for the duration of such sync pulses, modulator 41 will be activated and modulator 40 deactivated.

Similarly, the described arrangement may be employed so to shape the north-identifying pulse as to provide an inherently simple yet characteristic display at the decoding end of the communications link. In such a display, I prefer that the north-identifier or mark shall be evidenced by a radial strobe of length preferably equivalent to the full range display and therefore substantially equal to the period between synchronizing pulses. At the relay 53, I suggest means responsive both to the synchronizing pulses and to the north-identifier pulses and that at multivibrator 54, I suggest a means for developing north-mark identifiers of the desired elongation. Thus, the function of relay 53 may be to activate multivibrator 54 for the synchronizing pulse immediately following a north-mark or identifier pulse supplied from the generator 35. The multivibrator 54 may stay in this activated condition until reception of the next synchronizing pulse (as supplied by relay 53) at which time the multivibrator 54, a bi-stable device, will change its state, and relay 53 will be deactivated. I show by line 55 that the elongated pulse developed by the multivibrator 54 may be added to the synchronizing signals in line 52 so as to govern the operation of modulator 41 and effectively to deactivate the slowed-down video signals as discussed above for the case of synchronizing signals.

To complete the necessary intelligence applied to the communication link 37, I show means 56 responsive to the rate of antenna rotation, as, for example, a 60 cycle per second generator whose amplitude varies with antenna position. The output of the generator 56 may be applied directly to the mixer 44 but, as is hereinafter described, I prefer to elevate the frequency in accordance with another embodiment of the invention by employing a further modulator 57 to apply antenna-rate signals to the carrier frequency of an oscillator 58.

Figures 3A, 3B, 3C, 3D, 3E:
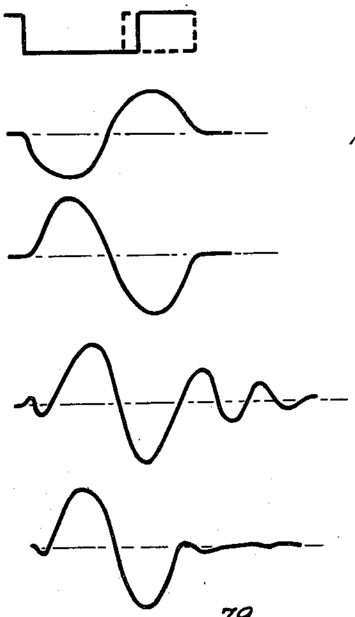
FIGS. 3(*a–e*) show waveforms of the information signals generated and transmitted by the apparatus of FIGS. 1 and 2.

Although the shown apparatus suitably compresses the raw-video intelligence for accommodation by a single communication link 37, distortion arises when this information is transmitted by the communication link 37. For example, the communication link 37 indicates accommodation by telephone lines having approximately a 0.2 to 3.4 kilocycle band-width. By referring to the waveforms of FIG. 3, a further appreciation of the distortions introduced by the communication link will be gained. The waveform of FIG. 3*a* is a single standardized and shaped video pulse transmitted from the gate 46 to the modulator 40. Upon receipt of the pulse, the modulator 40 transmits, for example, essentially a single sinusoid (FIG. 3*b*) to the line 42 for transmission to the mixer 44. The waveform of FIG. 3*c* shows the related signal fed from the mixer 44 to the communication link 37. When the tank circuit 47 is tuned to approximately the mid-band frequency of the communication link 37, a ringing waveform as shown in FIG. 3 is received at the output end of the link. This trailing-edge ringing is the result of both phase and amplitude distortion. In many instances, the first overshoot may be great enough to falsely indicate another video signal. However, it has been found that by suitably adjusting the carrier frequency of the tank circuit 47, a frequency is obtainable which produces a waveform such as shown in FIG. 3*e*. Therefore, the tank circuit 47 instead of producing a fixed frequency carrier, is provided with a tuning means (suggested at 47′) which permits the adjustment of the carrier frequency to a value which minimizes the distortion. For example, in the apparatus as shown, which is operating with a communications link having a 3.4 kc. bandwidth, the tank circuit is tunable between 1200 and 1800 cycles per second.

Since a similar phenomenon may occur with the modulated synchronizing signals fed from the modulator 41, the tank circuit 49 is preferably ganged with the tank circuit 47 and is adjustable over the same frequency range to minimize the distortion of the transmitted synchronizing signals; this relation is suggested by the dashed-line interconnection of adjustable means 47′—49′ in FIG. 1. It may be observed that the spectrum spread is much smaller for the modulated synchronizing signals, so that distortions are not so critical at the output of modulator 41.

Figure 2:
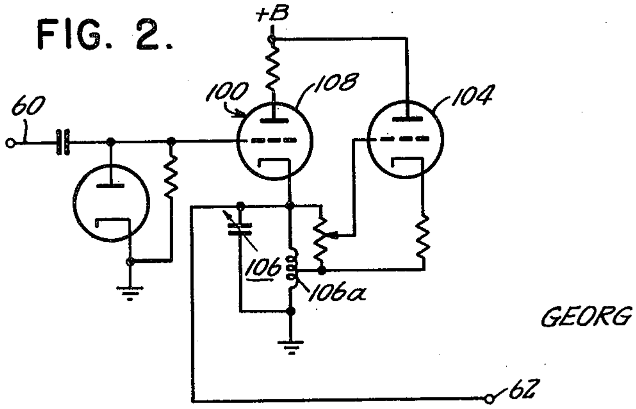
FIG. 2 shows the schematic diagram of a pulsed oscillator for generating sinusoids which may be incorporated in the apparatus of FIG. 1.

To further minimize the distortion, the modulator 40, the tank circuit 47, and the voltage limiter 48 may be replaced by the oscillator 100 of FIG. 2. The oscillator 100 is primarily a Hartley-type oscillator which includes the vacuum tube 104 and the tank circuit 106. The vacuum tube 108 is basically a switching tube to initiate and terminate the oscillations from the tank circuit 106. Quiescently, the vacuum tube 108 is conducting since its control grid to cathode bias is essentially zero. Therefore, current is flowing through the coil **106*a* of the tank circuit 106. When a negative pulse is received from the line 60, the vacuum tube 108 cuts off, and the tank circuit 106** starts ringing. The waveform in FIG. 3*b* shows the oscillation of the tank circuit as transmitted from the line 62. The output voltage initially decreases and starts producing a sinusoid. The sinusoid continues even after the input pulse signal, as shown in FIG. 3*a*, disappears. Finally, as the sinusoid retuns to the zero value, the control grid to cathode bias comes out of the cut-off region, and the vacuum tube 108 begins conducting to dampen the circuit. By selecting the duration of the pulse signal at somewhat greater than one-half, but less than the full period of the sinusoid, a single sinusoid is transmitted for each pulse signal received. For maximum data rate transmission, a single sinusoid is transmitted for each pulse signal received. More important, it should be noted that the single cycle of sinusoid starts and ends at zero amplitude so that the broad-band frequency spread is minimized.

Figure 4:
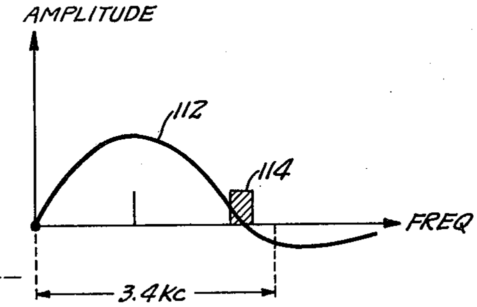
FIG. 4 is a diagram of frequency spread, characteristic of operation in accordance with the invention.

The curve 112 of FIG. 4 shows the frequency spectrum for a sinusoid of approximately 1.5 kc./s. It should be noted that at about 3.0 kc./s., the amplitude of the frequency components approaches zero and that beyond this point the amplitude of the frequency components is of a small negative value.

Thus, a single sinusoid starting and terminating at zero amplitude produces a frequency spectrum which is basically narrower in width than the bandwidth of a limited-band communication link.

It should be further noted that the capacitor **106*b* in the tank circuit 106 of the oscillator 100 (FIG. 2) is variable to permit the minimizing of the amplitude and phase distortion effects introduced by the communication link 37**.

Although the oscillator 100 has been described in conjunction with the video signals and for substitution for the modulator 40, the tank circuit 47 and the voltage limiter 48, a similar oscillator may be employed for the synchronizing signals and for replacing the modulator 41, the tank circuit 49 and the voltage limiter 50. In this substitution, it will be necessary to generate a sinusoid having a greater amplitude than the sinusoid of the video signals.

Returning to the spectrum of FIG. 4, and as has previously been noted, there is basically a null point about the frequency which is twice the carrier frequency. This null affords a convenient location for a carrier for the modulated antenna-rate signals, whereby interference with the video and synchronizing signals fed to the mixer 44 is minimized. This arrangement is illustrated in FIG. 4, wherein the band 114 for the modulated antenna-rate signals is centered on a carrier that is substantially twice the video carrier P; for the postulated communication channel, this means that the band 114 is centered about the three kc./s. frequency range and has a spread of about 100 cycles/sec. In such an arrangement, there is a minimum of interference between the modulated antenna-rate signals and the video and synchronizing signals fed to the communication link 37.

Figure 5:
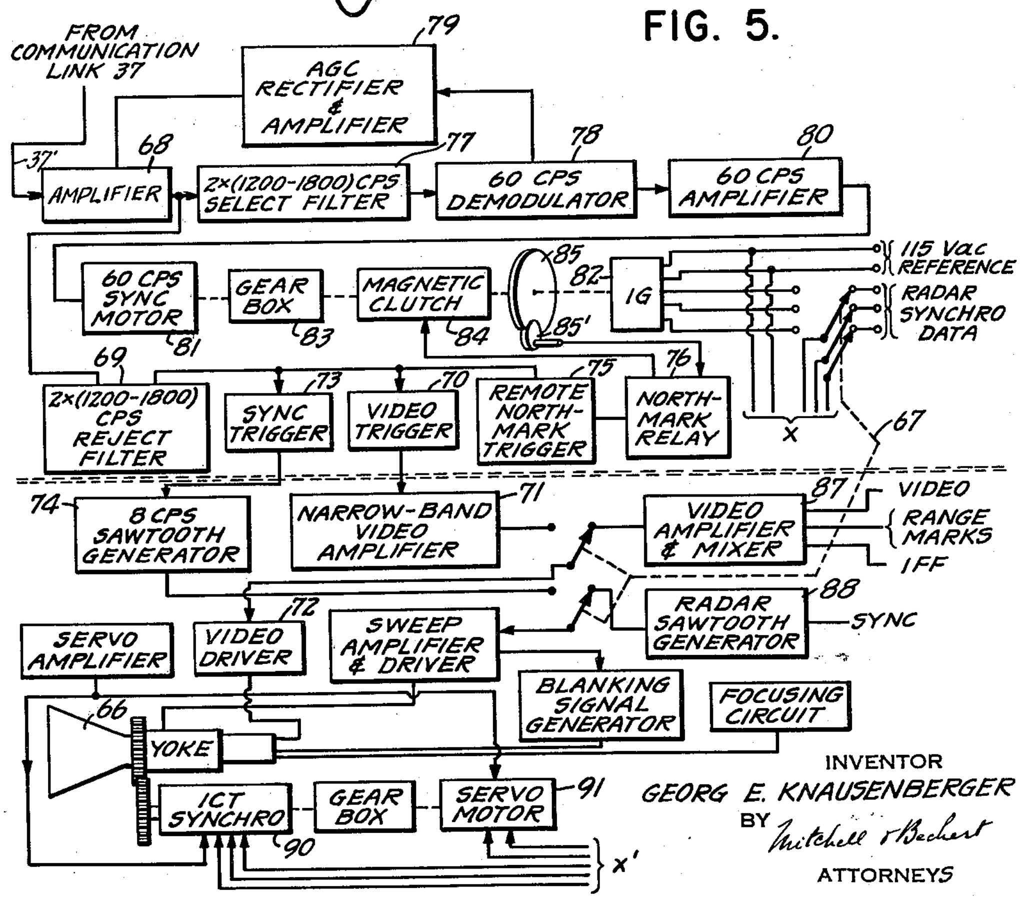
FIG. 5 is a block diagram schematically showing decoding equipment for demodulating and displaying signals received from the apparatus of FIG. 1.

FIG. 5 shows decoding equipment responsive to all intelligence transmitted over the communication link 37. Such intelligence arrives at the decoding equipment and is suitably transcribed and processed to produce on the face of the display tube 66 a properly synchronized PPI display, reflecting operation of the radar 10—12. The particular decoding and display circuitry of FIG. 5 also incorporates features whereby locally developed radar signals may be selectively accommodated and displayed, as upon operation of selector switches designated generally by the gang connection 67. In FIG. 5, all switches are shown establishing connections for operation of the display tube 66 from the local radar, but upon throwing switch 67 to the other position, the display tube 66 will reflect function of the radar 10—12. After preliminary amplification at 68, the signals to be decoded are passed through a frequency-reject filter 69 which rejects the carrier for the antenna-rate signal. All remaining signal is regarded as video and this includes the synchronizing pulse, the slowed-down video and the north-mark pulses. All these signals are accepted by a video trigger circuit 70, and those which are above the threshold of trigger circuit 70 generate a standard output signal which is shown passed to an amplifier 71 for direct application to the video amplifier 72 for the display tube 66.

The synchronizing signal is substantially above the amplitude of the slowed-down video when applied at the mixer 44 (FIG. 1). To minimize noise effects on the development of synchronizing signals, the synchronizing trigger 73 is preferably of a variety which, once triggered, will remain inactive for a substantial fraction of the synchronizing period. Thus, trigger circuit 73 favors video signals having the repetition rate of the synchronizing signal and uses signal amplitude to discriminate against low-level signals which might trigger it. The output of the circuit 73 may be a pulse used to activate a sweep generator 74 for use in radially deflecting the beam of the display tube 66 when displaying decoded slowed-down video.

For the north-identifier video-signal treatment described in connection with FIG. 1, the north-identifier signal passed by filter 69 is in reality a synthetic continuous target lasting for substantially the period between synchronizing pulses. This will cause a full-length radial strobe at north in the display tube 66. For north-orientation purposes, the north-mark decoder must discriminate against noise, and the north-mark trigger circuit 75 is therefore preferably an integrator which will not trigger on any signal which does not last for a period which is much less than the known length of north-identifier signals. When triggered, the circuit 75 may operate relay 76 which is tied in with a synchro system hereinafter described.

To derive antenna rate from the output of amplifier 68, I show a band-pass filter 77 responsive essentially only to the carrier frequency for the antenna-rate signal. This signal is demodulated at 78 and supplied with a level (controlled by means 79) to an antenna-rate amplifier 80. This signal is amplified and used to drive a synchronous motor 81 which in turn drives a synchro 82 through a gear box 83. The position of the synchro 82 thus follows the position of the antenna 10 at the encoding end of the system. However, the synchro 82 may have position error with respect to the antenna 10 unless north is re-established at the decoder end of the system. In the form shown, this is accomplished as follows: A magnetic clutch 84 in series with the synchro-drive system is ordinarily energized by the relay 76 so that the synchro 82 is continuously driven. When the synchro 82 reaches "local north" as represented by the notch position of a local-north cam 85 (with respect to a relay-disabling element 85'), relay 76 de-energizes clutch 84 to stop synchro 82 unless a north-identifier pulse is received from the remote end of the system. Arrival of the north-identifier pulse serves to hold in the relay 76 and therefore the magnetic clutch 84 so that the synchro rotation is not disturbed. If the system is not in synchronism, the synchro 82 stops the first time the local-north cam 85 reaches north and remains motionless until the arrival of the next remotely driven north-identifier signal, as indicated by operation of trigger 75. At that time, the synchro 82 starts to rotate and stays in synchronism until noise disturbs the system.

The synchro 82 forms part of a servo loop (including also the synchro 90 and motor 91) for positioning the deflection yoke of the display tube 66. The group designation X—X' will be understood to suggest this connection when the switch 67 has been thrown to the proper position.

As indicated generally above, the circuit of FIG. 5 is capable of accepting either normal, raw (broad band) radar video as from a local radar set or narrow-band video as available at the end of the communication link 37. Since the bandwidth requirements for a universal video amplifier would be difficult to meet, I show two separate video amplifiers, being the amplifier 71 (already described) and the amplifier 87 which may be a part of the local radar set. Also, since the sweep rates for spot deflection on the display tube 66 are so radically different for the two applications, separate sweep generators are shown. The slow-rate sweep generator 74 for the narrow-band video has already been described, and a fast-rate sweep circuit 88 is shown for selective connection to the display tube 66, depending upon whether a narrow-band or a raw-radar display is to be employed.

The yoke-drive system for rotating the strobe for a PPI display on display tube 66, may be conventional and may therefore directly accept both the described output of synchro 82 and the output of the local radar synchro, depending upon the selected position of switch 67. When display from the remote radar 10 is selected, display tube 66 will present full PPI information, including range marks, IFF signals and a full north-identifying radial strobe.

Figure 6:
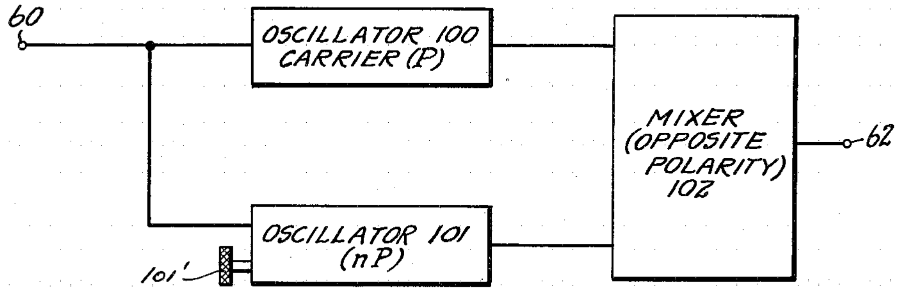
FIG. 6 shows, in block-diagram form, an alternative embodiment of the pulsed oscillator of FIG. 2 in accordance with another aspect of the invention.
Figure 7A:
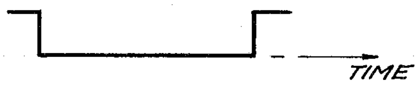
FIGS. 7(*a–b*) show waveforms associated with the pulsed-oscillator apparatus of FIG. 6.
Figures 7B, 8A, 8B:
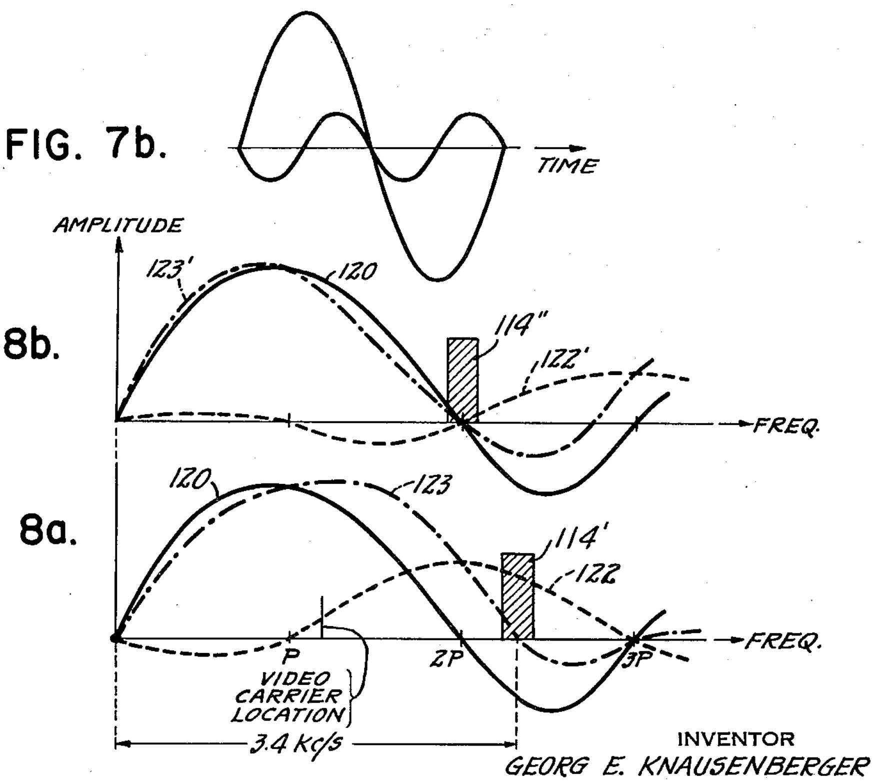
FIG. 8(*a–b*) are diagrams similar to FIG. 4 for the circuit and operation described in connection with FIGS. 6 and 7.

In FIG. 6, I illustrate a still further embodiment of the invention, for further minimizing the amplitude and phase distortion introduced by the communication link 37. The modulator of FIG. 6 further decreases the broad-band spread of the modulated-carrier signals. Essentially, the modulator 40, the tank circuit 47 and the voltage limiter 48 of FIG. 1 are replaced by the oscillator 100 and the oscillator 101, both feeding the mixer 102. The oscillator 100 is the same as the oscillator of FIG. 2, and the oscillator 101 is identical in construction but is tuned to a frequency ($n$P) which is an integer multiple of the frequency (P) of the oscillator 100. The output of both oscillators is mixed in phase opposition by the mixer 102 to produce the waveforms shown in FIG. 7*b* (wherein oscillator 101 is tuned to frequency 2P), and both oscillators are triggered by a video pulse as shown in FIG. 7*a*. By choosing the amplitude of the oscillator 101 to be 1-$n$th the amplitude of the signal from the oscillator 100, a more desirable waveform is produced; adjustment means for this purpose is suggested at 101'. The addition of the second oscillation eliminates some of the upper parts of the frequency spectrum of the first sinusoid. Therefore, the band limitation in the upper portion of the spectrum introduced by the transmission link will have less influence on the shape of the transmitted pulse. FIGS. 8*a* and 8*b* illustrate the situation in which the frequency of oscillator 101 is 2P and 3P, respectively, the curve 120 showing in both cases the frequency spectrum for the sinusoids transmitted by the oscillator 100, while the curves 122 and 122' show the pertinent portion of the frequency spectrum of the sinusoids transmitted by the oscillator 101. Composite spectra for the combined outputs of oscillators 100—101 are shown at 123—123', respectively. It should be noted that, particularly in the frequency range beyond 3 kilocycles, there is essentially a cancellation in frequency components, resulting effectively in a further narrowing of the frequency spread of the transmitted signals. The band 114' for the antenna-rate signal carrier may again be located at about 3 kc./s.

There have thus been shown improved methods and apparatus for transmitting data over narrow bandwidth communication links. The transmitted data not only has a minimum frequency-spectrum width but, by a proper choice of carrier frequency, the phase and amplitude distortion introduced by the communication link is further minimized. Further, apparatus has been shown which permits the transmission of two channels of information over a narrow band communication link which results in a minimum of interchannel interference.

It should be noted that although the apparatus of the invention has been described in relation to a specific radar-relay system for transmitting data over telephone lines, the apparatus is equally employable in other information systems wherein narrow-band communication links are used. These narrow-band links need not be telephone lines but may just as well be radio communication channels.

While I have shown and described the invention in detail for preferred forms shown, it will be understood that modifications may be made without departing from the scope of the invention as defined in the claims which follow.

I claim:

1. In combination, a plan-position-indicating radar including a directional antenna and means for continuously rotating same, band-compression means including periodically recycling means responsive to a radar video signal and developing a substantially slowed-down video signal for use in creating a plan-position-indicating display, means for developing synchronizing pulses in accordance with the recycling rate of said periodically recycling means, a first adjustable operating frequency pulsed oscillator for transmitting an integral number of sinusoids for each synchronizing pulse received, a second adjustable operating frequency pulsed oscillator for transmitting an integral number of sinusoids for each video signal received, means for multiplexing the signals transmitted from said first and second pulsed oscillators, antenna-rate responsive means developing a signal of frequency reflecting the rotation rate of said antenna, a sinusoidal signal generator, modulating signal means for modulating the signal from said sinusoidal signal generator with the signal from the antenna-rate responsive means, and means for mixing the signals from the multiplexing means and the modulating means for transmission to a communication link, the frequency of signals developed by the sinusoidal signal generator being twice the operating frequency of said pulsed oscillators.

2. Apparatus for transmitting information over a limited-bandwidth communication link which amplitude and phase distorts the transmitted signals, comprising a pulse-signal source for generating pulse signals representing the information, and a sinusoidal signal generator responsive to said pulse-signal source, said sinusoidal signal generator including means for transmitting an integral number of cycles of the sinusoidal signal for each pulse signal received, the sinusoid of each cycle starting at zero amplitude and terminating at zero amplitude, said sinusoidal signal generator transmitting the pulse-modulated sinusoidal signals to the communication link.

3. The apparatus of claim 2, wherein one cycle of the sinusoidal signal is transmitted for each pulse signal received.

4. The apparatus of claim 2, wherein means are included in the sinusoidal signal generator for adjusting the frequency of the sinusoidal signals to an operating frequency within the communication link bandwidth, the adjusted frequency being chosen to minimize the combined amplitude and phase distortion effects.

5. The apparatus of claim 2, wherein one cycle of the sinusoid is transmitted for each pulse signal received and including means in the sinusoidal generator for adjusting the frequency of the sinusoidal signals to frequency within the communication-link bandwidth, the adjusted frequency being chosen to minimize the combined amplitude and phase distortion effects on the signals transmitted by the communication link.

6. Apparatus for transmitting information over a limited-bandwidth communication link which amplitude and phase distorts transmitted signals, comprising a pulse signal source for generating pulse signals representing the information, first and second sinusoidal signal generators responsive to said pulse-signal source for transmitting integral numbers of cycles of sinusoidal signals for each pulse signal received, said first sinusoidal signal generator generating a signal with an operating frequency P and amplitude A, said second sinusoidal signal generator generating a signal with an operating frequency $nP$ and an amplitude substantially $A/n$, $n$ being an integer, the sinusoids of each of the sinusoidal signals generated starting at zero amplitude and terminating at zero amplitude, and means for mixing the sinusoidal signals from said second sinusoidal signal generator, said communication link receiving the mixed sinusoidal signals.

7. The apparatus of claim 6, wherein means are included for adjusting the operating frequency of said first sinusoidal signal generator to a frequency within the bandwidth of the communication link and for adjusting the operating frequency of said second sinusoidal signal generator to an integral multiple of that frequency for minimizing the amplitude and phase distortions of the signals transmitted by the communication link.

8. The apparatus of claim 6, wherein said first sinusoidal signal generator transmits a one-cycle sinusoidal signal for each pulse signal received and said second sinusoidal signal generator transmits a two-cycle sinusoidal signal for each pulse signal received.

9. The apparatus of claim 8, including means for adjusting the operating frequency of the first sinusoidal signal generator to a frequency within the bandwidth of the communications link and means for adjusting the operating frequency of the second sinusoidal signal generator to twice that frequency for minimizing both the amplitude and phase distortions of the signals transmitted by the communication link.

10. Apparatus for transmitting two classes of information over a limited bandwidth communication link which introduces amplitude and phase distortion in the transmitted signals representing the information, said first class of signals being represented by pulse signals and the second class by a varying analog voltage, comprising a pulsed sinusoidal signal generator for receiving the pulse signals representing the first class of information, said pulsed sinusoidal signal generator including means for transmitting a single sine wave cycle for each pulse signal received, the sine wave cycle starting and terminating at the zero amplitude level, a continuously operating sinusoidal signal generator for transmitting a sinusoidal signal having a frequency that is twice the operating frequency of the pulsed sinusoidal signal generator, means for amplitude modulating the continuously generated sinusoidal signal with the varying analog voltage representing the second class of information, and means for combining the signals from the pulsed sinusoidal signal generator and from said amplitude modulating means for transmission to the communication link.

11. The apparatus of claim 10, wherein means are included for adjusting the operating frequency of said pulsed sinusoidal signal generator to a frequency within the bandwidth of the communication link and for adjusting the frequency of the continuously operating sinusoidal signal generator to twice that frequency for minimizing the combined amplitude and phase distortion of the signals transmitted by the communication link.

12. The apparatus of claim 10, wherein said pulsed sinusoidal signal generator includes a first sinusoidal signal generator which transmits a single cycle of sine wave for each pulse signal received, a second sinusoidal signal generator which transmits a multiple cycle of sine wave for each pulse signal received, the cycles of said sine waves starting and terminating at zero amplitude, and means for mixing the signals from said first and second sinusoidal signal generators.

13. The apparatus of claim 10, wherein said pulsed sinusoidal signal generator includes a first sinusoidal signal generator which transmits a single-cycle sine wave for each pulse signal received, a second sinusoidal signal generator which transmits a multiple-cycle sine wave for each pulse signal received, the cycles of said sine waves starting and terminating at zero amplitude, means for mixing the signals from said first and second sinusoidal signal generators, and means for adjusting the operating frequency of said sinusoidal signal generator to a frequency within the bandwidth of the communication link and the operating frequency of the second sinusoidal signal generator and the frequency of the continuously operating sinusoidal signal generator to twice that frequency to minimizing the combined distortion of the signals transmitted to the communication link.

14. Apparatus for transmitting two classes of information over a limited bandwidth communication link which introduces amplitude and phase distortion in the transmitted signals representing the information, said first class of signals being represented by pulse signals and the second class by a varying analog voltage, comprising two sinusoidal signal generators of frequencies P and $n$P pulsed in phase opposition by pulse signals representing the first class of information, the outputs of said generators being mixed, a continuously operating sinusoidal signal generator for transmitting a sinusoidal signal having a frequency that is intermediate the operating frequencies of said pulsed generators, means for amplitude-modulating the continuously generated sinusoidal signal with the varying analog voltage representing the second class of information, and means for combining the signals from the pulsed sinusoidal signal generators and from said amplitude-modulating means for transmission to the communication link.

References Cited in the file of this patent

UNITED STATES PATENTS

| | | |
|---|---|---|
| 2,117,739 | Miller | May 17, 1938 |
| 2,412,670 | Epstein | Dec. 17, 1946 |
| 2,543,448 | Emslie | Feb. 27, 1951 |
| 2,555,121 | Emslie | May 29, 1951 |